US012579541B2

(12) United States Patent
English

(10) Patent No.: US 12,579,541 B2
(45) Date of Patent: Mar. 17, 2026

(54) EFFICIENT CREATION OF NON-FUNGIBLE TOKENS

(71) Applicant: Gemini IP, LLC, New York, NY (US)

(72) Inventor: Sean Matthew English, Longmeadow, MA (US)

(73) Assignee: Gemini IP, LLC, New York, NY (US)

( * ) Notice: Subject to any disclaimer, the term of this patent is extended or adjusted under 35 U.S.C. 154(b) by 131 days.

(21) Appl. No.: 17/536,852

(22) Filed: Nov. 29, 2021

(65) Prior Publication Data

US 2025/0104051 A1     Mar. 27, 2025

(51) Int. Cl.
G06Q 20/38 (2012.01)
G06F 16/23 (2019.01)
G06Q 20/36 (2012.01)

(52) U.S. Cl.
CPC ....... G06Q 20/382 (2013.01); G06F 16/2379 (2019.01); G06Q 20/3678 (2013.01); G06Q 2220/00 (2013.01)

(58) Field of Classification Search
CPC ............. G06Q 20/382; G06Q 20/3678; G06Q 2220/00; G06F 16/2379
See application file for complete search history.

(56) References Cited

U.S. PATENT DOCUMENTS

| | | | | |
|---|---|---|---|---|
| 10,438,290 B1* | 10/2019 | Winklevoss | ........ | G06F 16/1815 |
| 2020/0104929 A1* | 4/2020 | Walden | ................ | G06Q 20/383 |
| 2020/0242105 A1* | 7/2020 | Rich | ................... | H04L 67/1097 |
| 2021/0256070 A1* | 8/2021 | Tran | ................... | G06F 16/90332 |
| 2022/0318233 A1* | 10/2022 | Martinez | ............ | G06F 16/2379 |
| 2023/0079195 A1* | 3/2023 | Matheson | .......... | G06Q 20/0655 705/44 |
| 2023/0088674 A1* | 3/2023 | Lee | ......................... | G06F 21/64 705/75 |

* cited by examiner

*Primary Examiner* — John W Hayes
*Assistant Examiner* — Zehra Raza
(74) *Attorney, Agent, or Firm* — Lee & Hayes, P.C.

(57) ABSTRACT

Disclosed are various embodiments for efficiently creating non-fungible tokens. A smart contract can receive a non-fungible token (NFT) creation request that specifies a number of non-fungible tokens (NFTs) to create. The smart contract can then create a plurality of NFTs equal to the number of NFTs specified in the NFT creation request. The smart contract can subsequently assign each of the plurality of NFTs to a blockchain address. Finally, the smart contract can store, in a single operation, the plurality of NFTs to the blockchain.

20 Claims, 3 Drawing Sheets

141

116

Start

Receive NFT Transfer
Request                303

Invoke NFT Creation
Smart Contract         306

Transfer Created NFTs
to Specified Owner ID  309

End

EFFICIENT CREATION OF NON-FUNGIBLE TOKENS

BACKGROUND

Distributed ledgers, such as blockchains, offer a number of benefits to their users. For example, data stored in a blockchain is immutable and eventually consistent. In some implementations, executable code, often referred to as a smart contract, can be stored on the blockchain. Parties can request that the nodes of the blockchain execute these smart contracts on their behalf. However, many times nodes of the blockchain will require that fees be paid in order to execute a smart contract and/or store its results on the blockchain. In some situations, these fees can be quite expensive.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for improving the efficiency of, and reducing the costs associated with, creating non-fungible tokens (NFTs) and storing the NFTs on a distributed data store, such as a blockchain or other distributed ledger. As a result, NFTs can be created in a manner that reduces transaction fees paid to blockchain nodes to execute the smart contract for creating the NFTs and/or store the NFTs on the blockchain. This allows for NFTs to be created and stored even when the blockchain network is congested and transaction fees charged by the blockchain nodes are high at the time that the NFTs are created due to the congestion.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
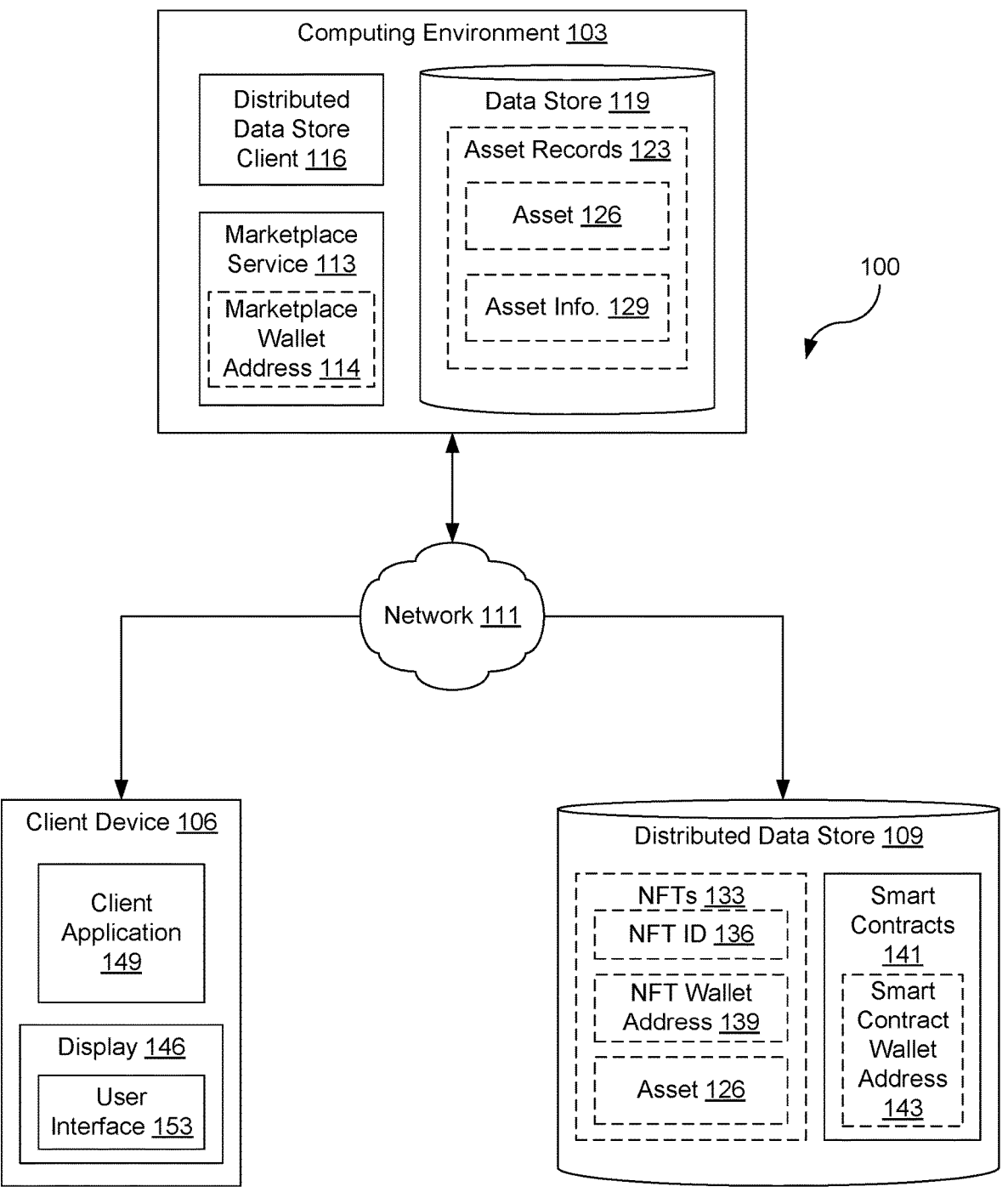
FIG. 1 is a drawing of a network environment according to various embodiments of the present disclosure.

With reference to FIG. 1, shown is a network environment 100 according to various embodiments. The network environment 100 can include a computing environment 103, a client device 106, and distributed data store 109, which can be in data communication with each other via a network 111. Although depicted separately for clarity, it should be noted that individual computers within the computing environment 103, as well as the client device 106, can also function as members of the distributed data store 109 in various embodiments of the present disclosure.

The network 111 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 111 can also include a combination of two or more networks 113. Examples of networks 113 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks, computer banks, or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 can include a marketplace service 113 and, in some implementations, a distributed data store client 116. Although depicted separately, the distributed data store client 116 could be implemented as a component of the marketplace service 113 in various embodiments of the present disclosure. Other applications, services, processes, systems, engines, or functionality not discussed in detail herein may also be executed by the computing environment 103.

Also, various data is stored in a data store 119 that is accessible to the computing environment 103. The data store 119 can be representative of a plurality of data stores 119, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 119 is associated with the operation of the various applications or functional entities described below. This data can include asset records 123 and potentially other data.

Individual asset records 123 can represent information related to an asset 126 that is distributed, sold, resold, or otherwise exchanged or transferred using the NFT market-place service 113. Accordingly, each asset record 123 can store an asset 126 and asset information 129, as well as other information. The asset 126 can represent tangible or intangible property that could be linked to or represented by a non-fungible token (NFT) 133. For example, the asset 126 could be a digital media file (e.g., an image file, an audio file, a video file, etc.), a record of title (e.g., a title to a vehicle, real estate, intellectual property, etc.), etc. Moreover, the asset 126 itself could be stored in the data store 119 as part of the asset record 123, or the asset 126 could be represented as a pointer or address (e.g., a URL, street address, etc.) that identifies where the asset 126 can be located or found. The asset information 129 can represent various metadata regarding the asset 126. This metadata could include the current owner of the asset 126, and potentially other data.

The marketplace service 113 can be executed to facilitate the acquisition and/or transfer of assets 126 between users of the marketplace service 113. For example, the marketplace service 113 could allow for an NFT 133 representing an asset 126 to be created, sold, resold, exchanged, or otherwise transferred between users of the marketplace service 113. Accordingly, the marketplace service 113 could provide one or more web pages that allow users to view assets 126 available for purchase, on auction, or that are currently owned by other users. The marketplace service 113 can also provide user specific services, such as assisting in the management, curation, or display of assets 126 owned by individual users.

The marketplace service 113 can be associated with a marketplace wallet address 114, which could be computed from or derived from the public key of a public-private key pair controlled by the owner or operator of the marketplace service 113. The marketplace wallet address 114 can represent the owner or operator of the marketplace service 113 and/or act as an identifier of the owner or operator of the marketplace service 113 in the distributed data store 109. For example, NFTs 133 that are minted or listed for sale or resale by the marketplace service 113 might have the marketplace wallet address 114 set as their NFT wallet address 139. Ownership of the NFTs 133 could then be tracked by the marketplace service 113 (e.g., using asset records 123 in the data store 119) while the NFTs 133 are assigned to the marketplace wallet address 114. Although a marketplace service 113 could have multiple marketplace wallet addresses 114, in some implementations the marketplace service 113 could use a single marketplace wallet address 114 for multiple purposes (e.g., an omnibus wallet or wallet address).

The distributed data store client 116 can be executed to facilitate the integration of the marketplace service 113 with the distributed data store 109. Accordingly, the distributed data store client 116 can create NFTs 133 for respective assets 126, transfer ownership of NFTs 133 from a wallet address of the distributed data store 109 that is associated with the marketplace service 113 to another wallet address of the distributed data store 109 (e.g., the wallet address of the purchaser or owner the asset 126). The distributed data store client 116 can also be used by the marketplace service 113 to read data stored in the distributed data store 109 as needed.

The distributed data store 109 represents a data storage network that is formed from multiple computing devices acting as nodes in the data storage network. In some implementations, any computing device could participate as a node of the distributed data store 109, including one or more client devices 106 or one or more computing devices of the computing environment 103. In general, each node can store a copy of the data stored in the distributed data store 109. When data is to be written to the distributed data store 109, each node can communicate with other nodes of the distributed data store 109 to validate and/or coordinate the storage of new records or data to the distributed data store 109. An illustrative example of a distributed data store 109 could be a blockchain which uses a proof-of-work, proof-of-stake, or proof-of-authority protocol to validate new blocks of data stored on the blockchain. Various types of data can be stored by the distributed data store 109.

For example, the distributed data store 109 could store one or more non-fungible tokens 133. An NFT 133 can represent a non-fungible data structure stored in the distributed data store 109, such as a blockchain, distributed ledger, or similar data store. Because an NFT 133 is non-fungible, it can be used for a variety of purposes where fungibility is undesirable. For example, an NFT 133 could be used to represent ownership or control of an asset 126, such as a non-fungible digital or physical item. Examples of non-fungible digital or physical items include works of art, a title to real or personal property, or other unique or non-fungible data. The NFT 133 can be structured or formatted to comply with various standards or protocols for non-fungible tokens. Examples of such standards include the ETHEREUM ERC-721 standard, ETHEREUM ERC-1155 standard, the FLOW blockchain NFT standard, the SOLANA blockchain NFT standard, etc. Because an NFT 133 is unique and non-fungible, each NFT 133 can also have an NFT identifier 136, which can represent a unique identifier for a respective NFT 133 that uniquely identifies the NFT 133 with respect to other NFTs 133. The NFT identifier 136 can be formatted in various ways, depending on which standard the NFT 133 complies with.

The NFT 133 can also be associated with an NFT wallet address 139. The NFT wallet address 139 can represent the owner of the NFT 133. Accordingly, the NFT wallet address 139 can be a unique identifier that uniquely identifies an individual with respect to other individuals. In some implementations, the NFT wallet address 139 could be computed from or derived from the public key of a public-private key pair used by the owner to authorize transactions.

One or more smart contracts 141 can also be stored by the distributed data store 109. Smart contracts 141 are executable programs that are both stored in the distributed data store 109 and executable by the nodes of the distributed data store 109. The smart contract 141 can be executed automatically when one or more predetermined conditions are met. The smart contract 141 can also be called or invoked by a node of the distributed data store 109 or a client interacting with the distributed data store 109, such as the distributed data store client 116. In various embodiments of the present disclosure, a smart contract 141 could be executed to create one or more NFTs 133 according to one or more predefined parameters and/or one or more arguments passed as input values to the smart contract 141.

Each smart contract 141 can also be associated with a smart contract wallet address 143. The smart contract wallet address 143 can represent the author or publisher of the smart contract 141 and/or act as an identifier of the smart contract 141 in the distributed data store 109. For example, the smart contract wallet address 143 could be computed from or derived from the public key of a public-private key pair controlled by the author or publisher of the smart contract 141.

The client device 106 is representative of a plurality of client devices that can be coupled to the network 111. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 146, such as liquid crystal displays (LCDs), gas plasma-based flat panel displays, organic light emitting diode (OLED) displays, electrophoretic ink ("E-ink") displays, projectors, or other types of display devices. In some instances, the display 146 can be a component of the client device 106 or can be connected to the client device 106 through a wired or wireless connection.

The client device 106 can be configured to execute various applications such as a client application 149 or other applications. The client application 149 can be executed in a client device 149 to access network content served up by the computing environment 103 or other servers, thereby rendering a user interface 153 on the display 146. To this end, the client application 149 can include a browser, a dedicated application, or other executable to allow a user to interact with the marketplace service 113, and the user interface 153 can include a web page, an application screen, or other user mechanism for obtaining user input or displaying information provided by the marketplace service 113.

Next, a general description of the operation of the various components of the network environment 100 is provided. Although the following description describes one example of the interaction between the various components of the network environment 100, it should be understood that the different components of the network environment 100 can operate or interact in other ways. More detailed descriptions of the operation of individual components of the network environment 100 is provided in the descriptions of the subsequent figures.

To begin, a creator or owner of an asset 126 could list the asset 126 for sale using the marketplace service 113. In some implementations, the distributed data store client 116 could invoke a smart contract 141 to create a respective NFT 133 for the asset 126. In some implementations, the smart contract 141 could then assign the NFT wallet address 139 of the creator or author to the newly created NFT 133. In other implementations, however, the smart contract 141 could instead assign the marketplace wallet address 114 as the NFT wallet address 139 of the newly created NFT 133.

Implementations wherein the smart contract 141 assigns the marketplace wallet address 114 as the NFT wallet address 139 for the NFT 133 could be used when the NFTs 133 are intended to be held in the custody of the marketplace service 113. For example, when a creator sells the NFT 133 for an asset 126 using the marketplace service 113, the buyer may wish to keep the NFT 133 in the custody of the marketplace service 113 to facilitate a resale on the secondary market. Therefore, it may be more efficient to assign the marketplace wallet address 114 as the NFT wallet address 139 of the newly created NFT 133 to avoid fees associated with transferring the NFT 133 between owner identifiers 139 (e.g., wallet addresses) of individual owners. In these implementations, the NFT identifier 136 could be returned by the smart contract 141 to the marketplace service 113 so that the marketplace service 113 could track the ownership of the NFT 133 by individual users of the marketplace service 113 while the NFT 133 is assigned to the marketplace wallet address 114 of the marketplace service 113.

Moreover, because owners of the NFT 133 asset 126 often leave the NFT 133 or asset 126 in the custody of the marketplace service 113, the marketplace service 113 could wait to have an NFT 133 created until the marketplace service 113 receives a request to transfer the asset 126 to an NFT wallet address 139 associated with a third party. In these situations, creating the NFT 133 on demand in response to a request to remove the asset 126 from the custody of the marketplace service 113 would avoid consuming computing or storage resources of the distributed data store 109, as well as any transaction costs (e.g., ETHEREUM gas fees), associated with recording each transaction or transfer of the asset 126 that occurs using the marketplace service 113. Instead, transaction fees and computing resources would only be consumed when the owner of the asset 126 removes the asset 126 from the custody of the marketplace service 113 by transferring ownership to an NFT wallet address 139 (e.g., a wallet address) under the control of the current owner of the asset 126.

In any of these implementations, the distributed data store 116 could specify the number of NFTs 133 to be created by the smart contract 141. If the number of NFTs 133 to be created is more than one, the smart contract 141 could create the NFTs 133 in a batch and store the batch of NFTs 133 to the distributed data store 109 in a single operation. This approach would utilize fewer computational resources of the distributed data store 109 compared to other approaches, such as sequentially or iteratively creating and storing each NFT 133 to the distributed data store 109. As a result, the distributed data store 109 would charge fewer transaction fees, such as the gas fees charged by the ETHEREUM blockchain network.

Figure 2:
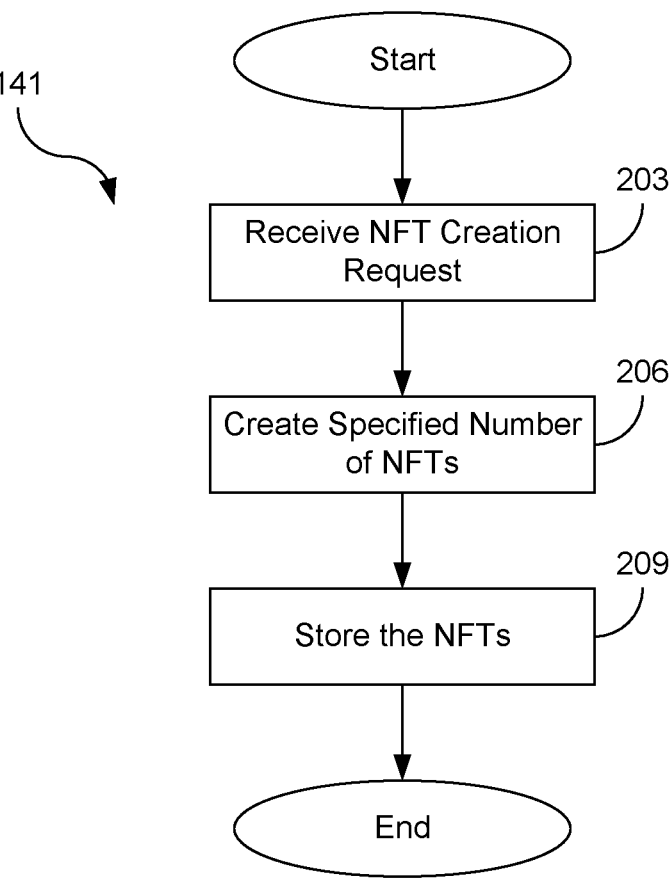
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the smart contract 141. The flowchart of FIG. 2 provides merely an example of the many different types of functional arrangements that can be employed to implement the operation of the depicted portion of the smart contract 141. As an alternative, the flowchart of FIG. 2 can be viewed as depicting an example of elements of a method implemented within the network environment 100.

Beginning with block 203, the smart contract 141 can receive a request to create one or more NFTs 133. The request could be received from a variety of sources, such as the distributed data store client 116. For example, the distributed data store client 116 could call or invoke a function to create the NFTs 133. As part of the function invocation, the number of NFTs 133 to be created could be passed as a parameter. In some implementations, the NFT wallet address 139 to which the NFTs 133 are to be assigned upon creation can also be passed as a function parameter. In other implementations, however, the smart contract 141 could use a default NFT wallet address 139, such as the marketplace wallet address 114 for the marketplace service 113.

Then, at block 206, the smart contract 141 can create the number of NFTs 133 specified in the request received at block 203. To reduce the amount of computing resources required by the distributed ledger 109 and the corresponding transaction fees that would be charged by the distributed ledger 109, the smart contract 141 can create the NFTs 133 in a batch instead of iteratively or sequentially. For example, the smart contract 141 could create an array of NFT 133 objects with the NFT wallet address 139 specified at block 203 or a default NFT wallet address 139. The smart contract 139 could then iterate through the array to assign a unique NFT identifier 136 to each NFT 133 in the array.

Next, at block 209, the smart contract 141 can store the NFTs 133 created at block 206 on the distributed data store 109. For example, the smart contract 141 could write or store the NFTs 133 created at block 206 to a blockchain, which would record that the NFTs 133 are associated with the NFT wallet address 139 specified at block 203. To reduce the computing resources and transactions fees consumed by the storage operation, the smart contract 141 could store all of the NFTs 133 created at block 206 in a single operation. For instance, rather than separately store each NFT 133 created at block 206 by sequentially or iteratively storing each NFT 133 in the distributed data store 209, which would require multiple write operations, the smart contract 141 could store the array of NFTs 133 in the distributed data store 109, which would require a single write operation to store the array.

Figure 3:
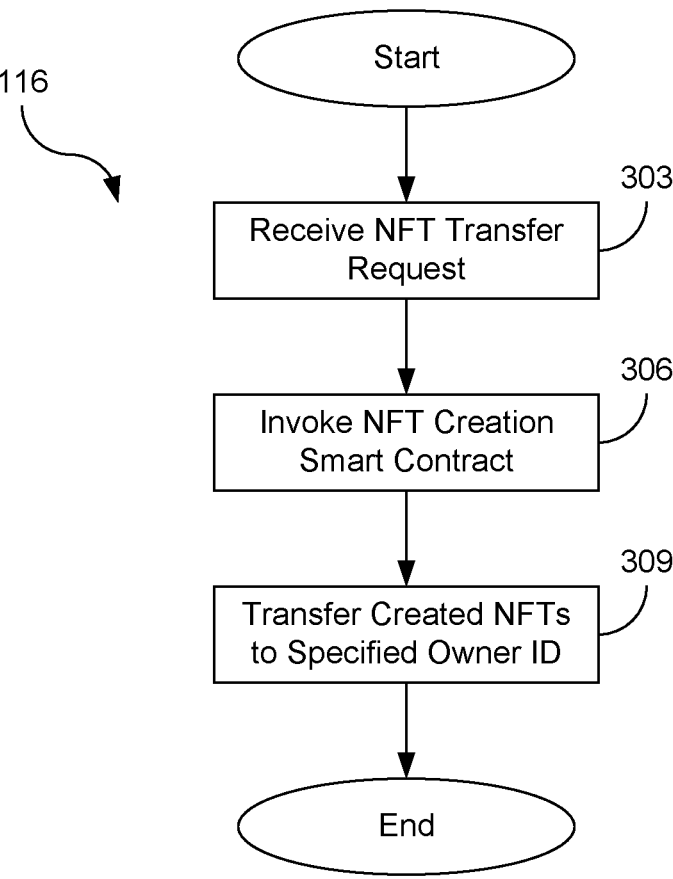
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the distributed data store client 116. The flowchart of FIG. 3 provides merely an example of the many different types of functional arrangements that can be employed to implement the operation of the depicted portion of the distributed data store client 116. As an alternative, the flowchart of FIG. 3 can be viewed as depicting an example of elements of a method implemented within the network environment 100.

Because users often buy, sell, and host their assets 126 using the marketplace service 113, and rarely transfer their assets 126 from the control of the marketplace service 113, the marketplace service 113 does not need to invoke a smart contract 141 to create an NFT 133 for an asset 126 until the user wishes to transfer their asset 126 to another NFT Wallet address 139. At this point, the marketplace service 113 can implement the process depicted in FIG. 3 to create the NFT 133 on demand for the user.

Beginning with block 303, the distributed data store client 116 can receive an NFT transfer request to transfer ownership of one or more assets 126 from the custody of the marketplace service 113. For example, the NFT transfer request could specify that the assets 126 are to be transferred to a user's personal wallet address on the ETHEREUM blockchain. The NFT transfer request can specify both the asset(s) 126 to be transferred and the NFT wallet address 139 (e.g., an ETHEREUM wallet address) to assign to the assets 126.

Then, at block 306, the distributed data store client 116 can invoke the smart contract 141 to generate the NFTs 133 for the assets 126 and store them on the distributed data store 109, as previously illustrated in FIG. 2. As part of the invocation process, the distributed data store client 116 can specify the number of NFTs 133 to be created. In some implementations, the distributed data store client 116 can specify the NFT wallet address 139 to assign to the created NFTs 133. In other implementations, however, the NFTs 133 could be created and assigned to a default NFT wallet address 139.

In some implementations, the different assets 126 may have different smart contracts 141 stored on the distributed data store 109 for the purpose of created respective NFTs 133. In these implementations, the distributed data store client 116 could determine the type of NFT 133 to be created based at least in part on the asset 126 and select the appropriate smart contract 141 for creating NFTs 133 for each type or class of asset 126.

Next, at block 309, the distributed data store client 116 can transfer the NFTs 133 created at block 306 to the individual associated with the NFT wallet address 139 received at block 303. This operation can be performed, for example, if the smart contract 141 invoked at block 306 assigned ownership of the created NFTs 133 to a default NFT wallet address 139. However, in those implementations where the NFT wallet address 139 was passed to the smart contract 141, the transfer depicted at block 309 can be skipped.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system for reducing computational resources associated with a blockchain, comprising:

a computing device comprising a processor and a memory; and machine-readable instructions stored in the memory that, when executed by the processor, cause the computing device to at least:

receive a non-fungible token (NFT) creation request that specifies a number of non-fungible tokens (NFTs) to create and a type of NFT to create;

generate a smart contract associated with creating a plurality of NTFs, wherein the smart contract as generated comprises a generated computer program configured to run on multiple nodes of a distributed network associated with the blockchain, and when executed, the multiple nodes are caused to execute the computer program;

associate the smart contract with a group of smart contracts configured to create the NFTs;

select, based at least in part on the type of NFT indicated in the NFT creation request, the smart contract from the group of the smart contracts;

execute the smart contract to create the plurality of NFTs having the NFT type equal to the number of NFTs specified in the NFT creation request, wherein the smart contract is executed automatically by the multiple nodes of the distributed network in response to one or more predetermined conditions being met, at least one of the predetermined conditions including the number of NFTs;

assign each of the plurality of NFTs to a blockchain address;

generate a single write operation configured to, when executed, cause the plurality of NFTs to be stored to the blockchain, wherein the single write operation is configured to replace multiple write operations that would be required if the plurality of NFTs were stored sequentially or iteratively;

store, in a single operation and utilizing the single write operation instead of the multiple write operations, the plurality of NFTs to the blockchain;

generate an array of NFTs in an NFT batch such that an amount of the computational resources being utilized in association with the blockchain are reduced; and transmit the array of NFTs to an omnibus wallet having multiple digital wallet addresses associated therewith, wherein the omnibus wallet differs from a digital wallet having a single digital wallet address.

2. The system of claim 1, wherein the machine-readable instructions that cause the computing device to create the plurality of NFTs further cause the computing device to at least assign each NFT in the array of NFTs a unique NFT identifier.

3. The system of claim 2, wherein the machine-readable instructions that store the plurality of NFTs to the blockchain further cause the computing device to store the array of NFTs to the blockchain.

4. The system of claim 1, wherein the NFT creation request is received in response to a user request to transfer an asset to a user controlled blockchain address.

5. The system of claim 1, wherein the NFT creation request further specifies the blockchain address for each of the plurality of NFTs.

6. The system of claim 1, wherein each NFT in the plurality of NFTs complies with an ETHEREUM Request for Comment 721 (ERC-721) standard.

7. The system of claim 1, wherein the blockchain comprises a version of an ETHEREUM blockchain.

8. A method for reducing computational resources associated with a blockchain, comprising:

receiving a non-fungible token (NFT) creation request that specifies a number of non-fungible tokens (NFTs) to create and a type of NFT to create;

generating a smart contract associated with creating a plurality of NTFs, wherein the smart contract as generated comprises a generated computer program configured to run on multiple nodes of a distributed network associated with the blockchain, and when executed, the multiple nodes are caused to execute the computer program;

associating the smart contract with a group of smart contracts configured to create the NFTs;

selecting, based at least in part on the type of NFT indicated in the NFT creation request, the smart contract from the group of the smart contracts;

executing the smart contract to creating the plurality of NFTs having the type of NFT equal to the number of NFTs specified in the NFT creation request, wherein the smart contract is executed automatically by the multiple nodes of the distributed network in response to one or more predetermined conditions being met, at least one of the predetermined conditions including the number of NFTs;

assigning each of the plurality of NFTs to a blockchain address;

generating a single write operation configured to, when executed, cause the plurality of NFTs to be stored to the blockchain, wherein the single write operation is configured to replace multiple write operations that would be required if the plurality of NFTs were stored sequentially or iteratively;

storing, in a single operation and utilizing the single write operation instead of the multiple write operations, the plurality of NFTs to the blockchain;

generating an array of NFTs in an NFT batch such that an amount of the computational resources being utilized in association with the blockchain are reduced; and transmitting the array of NFTs to an omnibus wallet having multiple digital wallet addresses associated therewith, wherein the omnibus wallet differs from a digital wallet having a single digital wallet address.

9. The method of claim 8, wherein creating the plurality of NFTs further include assigning each NFT in the array of NFTs a unique NFT identifier.

10. The method of claim 8, wherein storing the plurality of NFTs to the blockchain further comprises storing the array of NFTs to the blockchain.

11. The method of claim 8, wherein receiving the NFT creation occurs in response to a user request to transfer an asset to a user controlled wallet address for the blockchain.

12. The method of claim 8, wherein the NFT creation request further specifies the blockchain address for each of the plurality of NFTs.

13. The method of claim 8, wherein each NFT in the plurality of NFTs complies with an ETHEREUM Request for Comment 721 (ERC-721) standard.

14. The method of claim 8, wherein the blockchain comprises a version of an ETHEREUM blockchain.

15. A non-transitory, computer-readable medium for reducing computational resources associated with a blockchain, comprising machine-readable instructions that, when executed by a processor of a computing device, cause the computing device to at least:

receive a non-fungible token (NFT) creation request that specifies a number of non-fungible tokens (NFTs) to create and a type of the NFT to create;

generate a smart contract associated with creating a plurality of NTFs, wherein the smart contract as generated comprises a generated computer program configured to run on multiple nodes of a distributed network associated with a blockchain, and when executed, the multiple nodes are caused to execute the computer program;

associate the smart contract with a group of smart contracts configured to create the NFTs;

select, based at least in part on the type of NFT indicated in the NFT creation request, the smart contract from the group of the smart contracts;

execute the smart contract to create the plurality of NFTs having the NFT type equal to the number of NFTs specified in the NFT creation request, wherein the smart contract is executed automatically by the multiple nodes of the distributed network in response to one or more predetermined conditions being met, at least one of the predetermined conditions including the number of NFTs;

assign each of the plurality of NFTs to a blockchain address;

generate a single write operation configured to, when executed, cause the plurality of NFTs to be stored to the blockchain, wherein the single write operation is configured to replace multiple write operations that would be required if the plurality of NFTs were stored sequentially or iteratively;

store, in a single operation and utilizing the single write operation instead of the multiple write operations, the plurality of NFTs to the blockchain;

generate an array of NFTs in an NFT batch such that an amount of the computational resources being utilized in association with the blockchain are reduced; and transmit the array of NFTs to an omnibus wallet having multiple digital wallet addresses associated therewith, wherein the omnibus wallet differs from a digital wallet having a single digital wallet address.

16. The non-transitory, computer-readable medium of claim 15, wherein:

the machine-readable instructions that cause the computing device to create the plurality of NFTs further cause the computing device to at least assign each NFT in the array of NFTs a unique NFT identifier; and the machine-readable instructions that store the plurality of NFTs to the blockchain further cause the computing device to store the array of NFTs to the blockchain.

17. The non-transitory, computer-readable medium of claim 15, wherein the NFT creation request is received in response to a user request to transfer an asset to a user controlled wallet address for the blockchain.

18. The non-transitory, computer-readable medium of claim 15, wherein the NFT creation request further specifies the blockchain address for each of the plurality of NFTs.

19. The system of claim 1, the operations further comprising:

determining that the NFT creation request is associated with a marketplace service; and based at least in part on the NFT creation request being associated with the marketplace service, assigning a NFT wallet address as a marketplace wallet address.

20. The system of claim 1, the operations further comprising:

determining that the array of NFTs are to be held in custody by a marketplace service; and causing the array of NFTs to be held in custody by the marketplace service.

* * * * *